May 22, 1928.
J. M. TEAHEN
1,670,325
FLOAT VALVE FOR FLUSHING TANKS
Filed Jan. 24, 1927
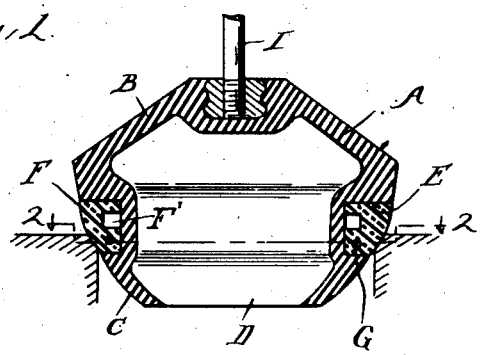
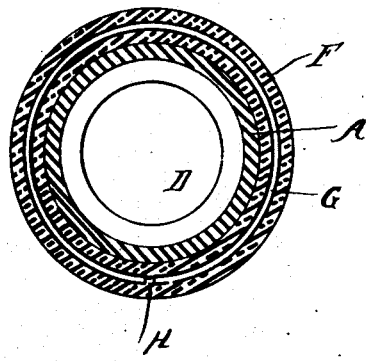
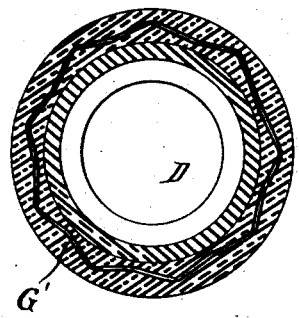
Inventor
James M. Teahen
By Whittemore Hulbert Whittemore
& Belknap
Attorneys Patented May 22, 1928.

1,670,325

UNITED STATES PATENT OFFICE.

JAMES M. TEAHEN, OF DETROIT, MICHIGAN.

FLOAT VALVE FOR FLUSHING TANKS.

Application filed January 24, 1927. Serial No. 163,275.

In the present state of the art one type of flushing valve in use is a hollow soft rubber ball attached to an operating stem and vented on its under side. In use this ball will seal against its seat in any position of engagement therewith and being hollow will float until the tank is emptied. One serious defect in this construction is the tendency for soft rubber to swell or grow in size after long immersion in water. As a consequence the ball frequently comes into contact with some adjacent part which interferes with its free movement toward its seat. This is particularly true with the quality of rubber which is generally used for such balls and which contains ingredients that will absorb water. On the other hand the soft rubber forms a more effective sealing means than any metallic valve and will be operative even where sediment is deposited on the seat.

It is the object of my invention to retain the advantages of a soft rubber ball and to prevent growth or swelling of the valve. To this end I have devised a construction where the hollow ball is formed of hard vulcanized rubber or other similar material but is provided with an annular zone of soft rubber for engagement with the valve seat, the detailed construction being as follows.

In the drawings;

Figure 1 is a vertical central section through my improved construction of valve showing the same in engagement with the valve seat.

Figure 2 is a horizontal section on line 2—2 of Figure 1.

Figure 3 is a similar view to Figure 2 showing another modification.

A is a hollow body formed of hard vulcanized rubber or other equivalent material such, for instance, as that known as bakelite. This body is formed with an imperforate top portion B and a segmental spherical lower portion C having a vent opening D in the bottom thereof. The portion C is also formed with an annular groove E for receiving a soft rubber gasket F. This gasket being comparatively small in mass can be made of a higher quality of rubber than commonly used for flush valves without greatly increasing the cost. It is also preferably formed with a channeled inner face which provides room for expansion and also forms a more yielding surface for engaging the seat. If desired, this gasket may be reinforced by a metallic band G molded therein and split at one point H so as to permit expansion when the gasket is engaged with its groove. A modified construction is illustrated in Figure 3 where the reinforcement is a continuous annular band G' but corrugated so as to be expansible for engagement with the groove.

For operating the valve a stem I is engaged with the upper end thereof. This engagement is preferably through the medium of a metallic insert J which is embedded in the vulcanized body and has a threaded aperture for engaging the threaded end of the stem.

In use the soft rubber gasket E will form as effective a seal as the soft rubber ball while the hard vulcanized rubber body will permanently retain its shape. The gasket being of higher grade rubber will retain its resiliency for a longer time and will not be subject to growth or enlargement. If, however, it does grow, growth is provided for expansion by the annular groove F' while the reinforcement G will hold it from accidental disengagement from the body. The gasket may, however, be easily removed and replaced by another gasket at small expense.

What I claim as my invention is:

1. A float valve comprising a hollow substantially rigid body formed of hard vulcanized rubber, a body having a segmental spherical portion with an annular groove therein and a gasket of soft rubber in said groove fitting against the opposite sides thereof and having a channel in its inner face.

2. A float valve comprising a hollow substantially rigid body formed of hard vulcanized rubber, said body having a segmental spherical portion with an annular groove therein, a gasket of soft rubber located in said groove and an annular metallic reinforcement embedded in said gasket for retaining the same in said groove.

3. A float valve comprising a hollow substantially rigid body formed of hard vulcanized rubber, said body having a segmental spherical portion with an annular groove therein, a gasket of soft rubber located in said groove and an annular reinforcement embedded in said gasket for retaining the same in said groove.

4. A float valve comprising a hollow substantially rigid body formed of hard vulcanized rubber and having a segmental spherical portion, a soft rubber gasket occupying a zone in said segmental spherical portion and means other than the tension of the soft rubber for retaining said gasket in said zone.

In testimony whereof I affix my signature.

JAMES M. TEAHEN.